US 6,649,726 B1

(12) United States Patent
Kawanabe et al.

(10) Patent No.: US 6,649,726 B1
(45) Date of Patent: Nov. 18, 2003

(54) TWO-COMPONENT TYPE POLYURETHANE COMPOSITION AND PROCESS OF PREPARING THE SAME

(75) Inventors: Hisashi Kawanabe, Yokohama (JP); Hiroaki Sakaguchi, Yokohama (JP); Kazuto Usaka, Yokohama (JP); Takashi Abe, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/632,801

(22) Filed: Aug. 4, 2000

(30) Foreign Application Priority Data

Aug. 5, 1999 (JP) ............................. 11-222157

(51) Int. Cl.[7] ................. C08G 18/32; C08G 18/10; C08G 18/28; C08J 9/04
(52) U.S. Cl. ................. 528/64; 521/155; 521/159; 521/163; 521/170; 528/68; 528/74; 528/76; 528/80; 528/85
(58) Field of Search ................ 528/64, 68, 76, 528/80, 85, 74; 521/159, 163, 155, 170

(56) References Cited

U.S. PATENT DOCUMENTS

| 3,595,917 A | 7/1971 | Trecker et al. ............... 564/454 |
| 3,714,127 A | 1/1973 | Fabris et al. ................. 528/44 |
| 3,857,809 A | * 12/1974 | Oertel et al. ................. 528/64 |

FOREIGN PATENT DOCUMENTS

| JP | B-54026274 | 9/1979 |
| JP | A-61228075 | 10/1986 |
| JP | A-05001273 | 1/1993 |

OTHER PUBLICATIONS

Patent Abstracts of Japan vol. 016, No. 198 (C–0939), May 13, 1992 & JP 04 031424 A (Mitsui Toatsu Chem Inc), Feb. 3, 1992.
Patent Abstracts of Japan vol. 016, No. 298 (C–0958), Jul. 2, 1992 & JP 04 081415 A (Mitsui Toatsu Chem Inc), Mar. 16, 1992.

* cited by examiner

*Primary Examiner*—Rabon Sergent
(74) *Attorney, Agent, or Firm*—Birch, Stewart, Kolasch & Birch, LLP

(57) ABSTRACT

The two-component type polyurethane composition according to the present invention is obtained from a principal component containing a compound having an isocyanate group and a curing agent containing a compound having active hydrogen, and is characterized in that both the principal component and the curing agent contain substantially no thixotropic agent, the mixture of the principal component and the curing agent has a specific thixotropy-developing time and a specific slump, the active hydrogen compound has a specific flash point, and that the mass change of the two-component type polyurethane composition before/after boiling in boiling water under specific conditions is in a specific range. The two-component type polyurethane composition according to the present invention develops excellent thixotropy immediately after mixing the principal component and the curing agent, thereby enables its application under a variety of conditions such as mechanical-application and hand-application, and has excellent sag resistance and other physical properties suitable for sealing materials.

14 Claims, No Drawings

TWO-COMPONENT TYPE POLYURETHANE COMPOSITION AND PROCESS OF PREPARING THE SAME

DETAILED DESCRIPTION OF THE INVENTION

1. Field of the Invention

The present invention relates to a two-component type polyurethane composition, a two-component type micro foamed polyurethane elastomer, applications thereof and a process of preparing the same. In particular, the present invention relates to a two-component type polyurethane composition and a two-component type micro foamed polyurethane elastomer both excellent in sag resistance, a process of preparing the same, a polyurethane sealant for sealing joints in buildings, doors and the like, and in bodies of cars, and a process of preparing the same.

2. Background of the Invention

Due to their excellent physical properties such as rubber elasticity, cold proof resistance and durability, polyurethane resins have been lately used as sealing materials for buildings, cars, etc. The sealing materials for use in buildings and cars are required to be applicable to the base surface of a variety of shapes. And it is particularly important for them to have such excellent sag resistance that they do not sag down while being applied to a vertical or sloping surface even to enough thickness to exhibit watertightness.

Thus, in order to prevent the fluid from sagging, mineral fillers such as surface treated calcium carbonate, colloidal silica and bentonite, which have been treated with higher fatty acid or fatty ester, or organic matter such as hydrogenated castor oil, aliphatic amide wax or polytetrafluoroethylene resin (PTFE) have been generally added to the polyurethane resins as thixotropy-imparting agent (thixotropic agent).

The use of these thixotropic agents, however, causes problems that, since a large amount of such agents must be add to the polyurethane resins so as to enhance the sag resistance, apparent viscosity of the polyurethane resins increases at the time of their application, and hence workability is deteriorated and that the resins with such agents are often poor in storage stability.

The use of amines, as thixotropic agents, has been also well known. For example, there is disclosed in Japanese Patent Publication No. 54-26274 a method of preparing a polyurethane elastomer which is characterized by reacting a polyisocyanate component and polyoxyalkylene polyamine. And there is disclosed in Japanese Patent Publication No. 53-4527 a method of preparing an adhesive based on polyurethane composed of an isocyanate-terminated prepolymer, a polyhydroxy compound and a catalyst in which part of the polyhydroxy compound is substituted with a primary amine compound having a chemical formula $R(NH_2)_n$ (wherein R represents an aliphatic hydrocarbon group having 8 or less carbon atoms, n=2 to 4) in an amount of 4 to 30% by equivalent weight based on the free isocyanate group content of prepolymer.

Each of these methods, however, has a problem that it takes several seconds to several minutes from the moment of mixing a polyisocyanate component and active hydrogen component of amine, etc. to the moment of the development of thixotropy. Thus, although they are applicable in the case of hand-application with a caulking gun or mechanical-application with a low-pressure apparatus, they have no practical use in the case of application with a high-pressure apparatus which requires higher working efficiency, because it takes them too much time to allow the development of thixotropy to take place.

In such a situation, there have been demands that sealing materials should appear which enable more excellent development of thixotropy and have more excellent physical properties, thereby are applicable under various conditions such as mechanical-application, hand-application and application with a high-pressure apparatus.

In light of the above problems, the present inventors concentrated their energies on studying a two-component type polyurethane composition in which development of excellent thixotropy takes place immediately after mixing a polyisocyanate component and active hydrogen compound component. And the present inventors finally found that, for the two-component type polyurethane composition or the two-component type micro foamed polyurethane elastomer obtained from a polyisocyanate component and active hydrogen compound component, when using an alicyclic diamine as active hydrogen compound, it develops such excellent thixotropy that it is applicable under various conditions such as mechanical-application, hand-application, etc. even if it substantially contains no thixotropic agents, because the alicyclic diamine participates in the development of thixotropy, and that the above composition or elastomer has excellent sag resistance and other physical properties. The present inventors also found that the above composition or elastomer is suitable for sealing material, which led to the completion of the present invention.

OBJECT OF THE INVENTION

The present invention was made to solve the problems attendant to the prior arts as described above, and the object of the present invention is to provide a two-component type polyurethane composition and a two-component type micro foamed polyurethane elastomer which develop excellent thixotropy immediately after mixing a compound having an isocyanate group and a compound having active hydrogen, enable their application under various conditions such as mechanical-application, hand-application, etc, and in addition, have excellent sag resistance and other physical properties suitable for sealing materials, and a method of preparing the same.

SUMMARY OF THE INVENTION

The two-component type polyurethane composition according to the present invention is obtained from a principal component containing a compound having an isocyanate group and a curing agent containing a compound having active hydrogen and is characterized in that both the above principal component and the above curing agent contain substantially no thixotropic agent, the total time from the moment of mixing the above principal component and the above curing agent to the moment of the development of thixotropy is 2 seconds or shorter, the slump of the mixture of the above principal component and the above curing agent is 3 mm or smaller, the above compound having active hydrogen has flash point of 60° C. or higher, and that, when boiling the cured two-component type polyurethane composition in boiling water under atmospheric pressure for 60 minutes, change in mass of the above cured two-component type polyurethane composition before and after the boiling is 0.6% or smaller by mass.

Preferably the two-component type polyurethane composition described above has break strength of not less than 0.5

MPa and not more than 30 MPa at −30° C. and elongation at break of not less than 50% and not more than 700% at −30° C. Preferably the compound having active hydrogen described above has at least two hydroxyl groups and/or at least two amino groups.

Preferably the two-component type polyurethane composition described above has a constitutional unit having the following general formula [I]:

wherein m, n represent an integer from 1 to 5 independently, in the rate of not less than 0.001% and not more than 30% by mass.

Preferably the compound having active hydrogen described above contains alicyclic diamine.

Preferably the above alicyclic diamine is polycyclic aliphatic diamine having the following general formula [II]:

wherein m, n represent an integer from 1 to 5 independently.

Preferably the above alicyclic diamine content of the compound having active hydrogen described above is not less than 1% and not more than 50% by equivalent weight as active hydrogen group conversion on the basis of the total active hydrogen group in the same compound.

The two-component type micro foamed polyurethane elastomer according to the present invention is obtained from a principal component containing a compound having an isocyanate group, a curing agent containing a compound having active hydrogen and a foaming agent and is characterized in that both the above principal component and the above curing agent contain substantially no thixotropic agent, the total time from the moment of mixing the above principal component, the above curing agent and the above foaming agent to the moment of the development of thixotropy is 2 seconds or shorter, the slump of the mixture of the above principal component, the above curing agent and the above foaming agent is 3 mm or smaller, the above compound having active hydrogen has flash point of 60° C. or higher, and that, when boiling the cured two-component type micro foamed polyurethane elastomer in boiling water under an atmospheric pressure for 60 minutes, change in mass of the above cured two-component type polyurethane elastomer before and after the boiling is 0.6% or smaller by mass. Preferably, the above two-component type micro foamed polyurethane elastomer has a total density of 100 to 900 kg/m$^3$ and the average diameter of its cells is 1 to 100 μm.

Preferably the two-component type micro foamed polyurethane elastomer described above has a constitutional unit having the following general formula [I]:

wherein m, n represent an integer from 1 to 5 independently, in the rate of not less than 0.001% and not more than 30% by mass.

Preferably the compound having active hydrogen described above contains alicyclic diamine.

Preferably the above alicyclic diamine is polycyclic aliphatic diamine having the following general formula [II]:

wherein m, n represent an integer from 1 to 5 independently.

The process of preparing the two-component type polyurethane composition according to the present invention is characterized by using a principal component containing a compound having an isocyanate group, a curing agent containing alicyclic diamine.

The polyurethane sealant according to the present invention is characterized by containing the above two-component type polyurethane composition or the above two-component type micro foamed polyurethane elastomer.

The process of preparing the polyurethane sealant according to the present invention is characterized by using the above two-component type polyurethane composition or the above two-component type micro foamed polyurethane elastomer.

DETAILED DESCRIPTION OF THE INVENTION

The two-component type polyurethane composition or the two-component type micro foamed polyurethane elastomer according to the present invention is obtained by mixing a principal component containing a compound having an isocyanate group and a curing agent containing a compound having active hydrogen (hereinafter sometimes referred to as "active hydrogen compound") such as alicyclic diamine, etc. The curing agent generally contains polyol, and both of the principal component and the curing agent may contain other additives according to situations.

The two-component type polyurethane composition, the two-component type micro foamed polyurethane elastomer and the process of preparing the same will be described in further detail.

Two-component Type Polyurethane Composition

The two-component type polyurethane composition according to the present invention is obtained from a principal component (A) containing a compound having an isocyanate group and a curing agent (B) containing a compound having active hydrogen, and both the above principal component (A) and the above curing agent (B) contain substantially no thixotropic agent.

The two-component type polyurethane composition according to the present invention develops thixotropy after mixing the above principal component and the above curing agent. The total time immediately after the moment of mixing the above principal component and the above curing agent to the development of thixotropy is 2 seconds or shorter, preferably 1.5 seconds or shorter, and more preferably 1 seconds or shorter.

The slump of the mixture of the above principal component and the above curing agent is 3 mm or smaller, preferably 2 mm or smaller, and more preferably 1 mm or smaller.

The above compound having active hydrogen has flash point of 60° C. or higher, preferably 65° C. or higher, and more preferably 70° C. or higher.

When boiling the above two-component type polyurethane composition, which is obtained by curing the above mixture, in boiling water under an atmospheric pressure for 60 minutes, change in mass of the above two-component type polyurethane composition before and after the boiling is 0.6% or smaller by mass, preferably 0.55% or smaller by mass.

The term "substantially contain no thixotropic agent" used herein means that the content of the compounds having the function of thixotropic agents, other than the compound having an isocyanate group and the compound having active hydrogen both of which participate in the formation of urethane bond of the process of the two-component type polyurethane composition or the two-component type micro foamed polyurethane elastomer of the invention, in the two-component type polyurethane composition or the two-component type micro foamed polyurethane elastomer is 0.001% or smaller by mass of the whole two-component type polyurethane composition or the whole two-component type micro foamed polyurethane elastomer.

For the two-component type polyurethane composition according to the present invention, desirably its break strength at −30° C. is preferably not less than 0.5 MPa and not more than 30 MPa and more preferably not less than 1.0 MPa and not more than 25 MPa. Further, for the two-component type polyurethane composition according to the present invention, desirably its elongation at break at −30° C. is preferably not less than 50% and not more than 700% and more preferably 600% or smaller.

Desirably the two-component type polyurethane composition according to the present invention has a constitutional unit having the following general formula [I]:

wherein m, n represent an integer from 1 to 5 independently, in the rate of not less than 0.001% and not more than 30% by mass and preferably in the rate of not less than 0.005% and not more than 25% by mass.

Process of Preparing Two-component Type Polyurethane Composition

The two-component type polyurethane composition according to the present invention is composed of the above principal component (A) containing a compound having an isocyanate group and the above curing agent (B) containing a compound having active hydrogen and can be prepared by mixing the above principal component (A) and the above curing agent (B) by conventional mixing procedure.
<Principal Component (A)>

The compounds having an isocyanate group, which are contained in the principal component (A) used in the present invention, are generally organic compounds having an isocyanate group, and such organic compounds include, for example, aromatic isocyanate, aliphatic isocyanate, alicyclic isocyanate, the mixture thereof, or modified organic isocyanate compounds such as urethane prepolymer, etc.

Of all the above organic compounds, preferably used are urethane prepolymers having isocyanate group ends which are obtained by reacting a polyisocyanate compound having two or more isocyanate groups in a molecule or a polyisocyanate having two or more molecular end isocyanate groups in a molecule with an active hydrogen compound under the stoichiometrically excessive conditions.

(Compound Having Isocyanate Group (Isocyanate))

The compounds having an isocyanate group used in the principal component may be isocyanates used in conventional polyurethane resin compositions. Preferably used are polyisocyanates having 2 or more molecular end isocyanate groups per molecular.

The compounds having isocyanate-groups include, for example, aromatic isocyanates such as tolylene diisocyanate (TDI), hydrogenated tolylene diisocyanate, diphenylmethane diisocyanate (MDI), polymeric MDI (PMDI), xylylene diisocyanate (XDI) and 1,5-naphthalene diisocyanate (NDI); aliphatic isocyanates such as hexamethylene diisocyanate (HDI); alicyclic polyisocyanates such as isophorone diisocyanate (IPDI), hydrogenated XDI (H6XDI), hydrogenated MDI (H12MDI) and methyl norbornane diisocyanate (NBDI); carbodiimide modified isocyanates of the above isocyanates; and modified isocyanurates, etc.

Of all the above compounds, in terms of reactivity, preferably used are TDI, MDI, carbodiimide modified MDI (fluid MDI) and PMDI.

The compounds having isocyanate groups may be used solely or in the form of mixture of two or more kinds.

(Active Hydrogen Compound used for Preparing Urethane Prepolymer)

The active hydrogen compounds used for preparing the above urethane prepolymer may be those used for preparing conventional polyurethane resin compositions obtained from an isocyanate and active hydrogen compounds such as polyol.

To be concrete, the active hydrogen compounds are compounds having active hydrogen reactive with isocyanates, such as polyols (compounds having two or more hydroxyl groups at its ends) and diamine compounds.

The above polyols include, for example, polyhydric alcohols having relatively low-molecular weight, polyether polyols, polyester polyols, or modified polyether polyols and polyester polyols.

To be more concrete, the polyhydric alcohols having relatively low-molecular weight include, for example, dihydric alcohols such as ethylene glycol (EG), diethylene glycol (DEG), propylene glycol (PG), dipropylene glycol (DPG), 1,3-butanediol (1,3-BD), 1,4-butanediol (1,4-BD), 4,4'-dihydroxyphenylpropane and 4,4'-dihydroxyphenylmethane; trihydric alcohols such as glycerol, 1,1,1-trimethylolpropane (TMP), 1,2,5-hexanetriol; and polyhydric alcohols having four or more hydroxyl groups in a molecule such as pentaerythritol, glucose, sucrose and sorbitol.

The polyether polyols include, for example, polyether polyols obtained by the addition polymerization of one kind or more kinds of polyhydric alcohols having relatively low-molecular weight and one kind or more kinds of oxides selected from the group consisting of ethylene oxide, propylene oxide, butylenes oxide, etc., and poly(tetramethylene ether) glycol (PTMEG) obtained by the ring-opening polymerization of tetrahydrofuran.

The polyester polyols include, for example, ethylene glycol, propylene glycol, butanediol, pentanediol, hexanediol, glycerol, trimethylolpropane, in addition, polyester polyols obtained by the condensation polymerization of at least one kind of other low-molecular weight polyols and at least one kind of acids selected from the group consisting of glutaric acid, adipic acid, sebacic acid, terephthalic acid, isophthalic acid, dimer acids, or other low-molecular dicarboxylic acids and oligomer acids, and polyester polyols obtained by the ring-opening polymerization of caprolactone, etc.

The modified polyether polyols or polyester polyols include, for example, polymer polyols obtained by the graft polymerization of the above described well-known polyether polyols or polyester polyols and ethylenic unsaturated compounds such as acrylonitrile, styrene and methyl methacrylate.

The diamine compounds include, for example, aliphatic diamines such as ethylenediamine and aromatic diamines.

Of all the above described active hydrogen compounds, polyols are preferable. In terms of low viscosity of materials and improvement in water resistance of the sealant to be obtained, relatively low-molecular weight polyhydric alcohols and polyether polyols are more preferable.

These active hydrogen compounds can be used solely or in combination with two or more kinds.

(Method of Synthesizing Urethane Prepolymer)

The methods of synthesizing urethane prepolymer are not limited to any specific ones. Urethane prepolymer can be obtained, for example, following the procedure of: mixing isocyanate in excess of that stoichiometrically required and an active hydrogen compound at a time, or preparing any one of them first, then adding the other one thereto; and allowing them to react with each other at 10 to 120° C. for 1 to 150 hours. The reaction may be allowed to proceed using well-known catalysts so as to enhance the reaction rate.

Curing Agent (B)

The curing agent (B) according to the present invention contains a compound having active hydrogen. The active hydrogen compound has flash point of 60° C. or higher, as described above, and generally contains polyamine having two or more amino groups in a molecule and/or polyol having two or more hydroxyl groups in a molecule. The curing agent (B) may contain chain extender, catalysts, etc. according to situations. The use of the active hydrogen compound having flash point of 60° C. or higher enables the operation of the two-component type polyurethane composition to be easier when using it on a building site, etc., moreover, it enables the suppression of odor; thereby the good working environment can be easily maintained on site.

The curing agent (B) can be preferably used as a sealing material by optionally mixing it with additives such as filler, plasticizer, age resister, ultraviolet absorber, light stabilizer, anti oxidant, coloring materials such as pigment and dye, and dispersant.

The curing agent (B) can be used as a foam sealing material by the addition of foam stabilizer and foaming agent. Part of or the whole amount of these and other additives to be mixed may be added to the principal component as long as their addition does not deteriorate the effects of the present invention.

<Polyol>

The polyols used in the curing agent (B) may be the same as or different from those used in the urethanepolymer of the above described principal component (A).

The polyols include, for example, polyhydric alcohols having relatively low-molecular weight, polyether polyols, polyester polyols, caprolactone polyols, polycarbonate polyols, or modified polyether polyols and polyester polyols.

These polyols can be used solely or in the form of the mixture of two or more kinds.

(Polyhydric Alcohol)

To be more concrete, the polyhydric alcohols having relatively low-molecular weight include, for example, dihydric alcohols such as ethylene glycol (EG), diethylene glycol (DEG), propylene glycol (PG), dipropylene glycol (DPG), 1,3-butanediol (1,3-BD), 1,4-butanediol (1,4-BD), 4,4'-dihydroxyphenylpropane and 4,4'-dihydroxyphenylmethane; trihydric alcohols such as glycerol, 1,1,1-trimethylolpropane (TMP), 1,2,5-hexanetriol; and polyhydric alcohols having four or more hydroxyl groups in a molecule such as pentaerythritol, glucose, sucrose and sorbitol.

(Polyether Polyol)

The polyether polyols include, for example, polyether polyols obtained by the addition polymerization of at least one kind of polyhydric alcohols having relatively low-molecular weight and at least one kind of oxides selected from the group consisting of ethylene oxide, propylene oxide, butylenes oxide, etc., and poly(tetramethylene ether) glycol (PTMEG) obtained by the ring-opening polymerization of tetrahydrofuran.

(Polyester Polyol)

The polyester polyols include, for example, polyester polyols obtained by the condensation polymerization of at least one kind of polyols selected from the group consisting of ethylene glycol, propylene glycol, butanediol, pentanediol, hexanediol, glycerol, trimethylolpropane, etc. or other low-molecular weight polyols and at least one kind of acids selected from the group consisting of glutaric acid, adipic acid, sebacic acid, terephthalic acid, isophthalic acid, dimer acids, etc. or other low-molecular weight dicarboxylic acids and oligomer acids, and polyester polyols obtained by the ring-opening polymerization of caprolactam, etc.

(Polycaprolactone Polyol)

The polycaprolactone polyols applicable to the present invention are the polyols obtained from ε-caprolactone and polyhydric alcohol, and generally those having number-average molecular weight of 500 to 4000 and hydroxyl value of about 30 to 240 mgKOH/g are preferable. As polyhydric alcohols, those used in the above described polyester polyols can be used.

(Polycarbonate Polyol)

The polycarbonate polyols applicable to the present invention are straight-chain aliphatic diols obtained by the condensation reaction of the polyhydric alcohols, such as 1,4-butanediol and 1,6-hexanediol, and the carbonates, such as dimethyl carbonate and diethyl carbonate, and generally those having hydroxyl value of about 60 to 200 mgKOH/g are preferable.

(Modified Polyether Polyol or Polyester Polyol)

The modified polyether polyols or polyester polyols include, for example, the polymer polyols obtained by the graft polymerization of the above described known polyether polyols or polyester polyols and ethylenic unsaturated compounds such as acrylonitrile, styrene and methyl methacrylate.

When using these modified polyether polyols or polyester polyols as active hydrogen compounds, their amount used may be properly set according to the objects of their physical properties; generally and desirably the amount is 5 to 250 parts by mass per 100 parts of the principal component (A), preferably 10 to 220 parts by mass.

(Polymer Polyol)

The polyether polyols according to the present invention may be used as polymer polyols. These polymer polyols are the vinyl polymer particle dispersing polyols obtained by the dispersion polymerization of ethylenic unsaturated group containing monomers, such as acrylonitrile and styrene, in polyether polyol using free-radical initiator such as azobisisobutyronitrile. Desirably the polymer content of the polyether polyol is 2 to 50% by mass, preferably about 10 to 40% by mass. Preferably the polymer polyols contain at least 30% styrene, as a vinyl polymer, by mass, preferably 35% or more styrene by mass.

(Alicyclic Diamine)

As polyamines used in the curing agent (B) according to the present invention, preferably used are alicyclic diamines. The alicyclic diamines include, for example, 2,5(6)-diaminomethylbicyclo[2,2,1]heptane, 2-aminomethyl-5(6)-aminoethylbicyclo[2,2,1]heptane, 2-aminomethyl-5(6)-aminopropylbicyclo[2,2,1]heptane, 2-aminomethyl-5(6)-aminobutylbicyclo[2,2,1]heptane, 2-aminomethyl-5(6)-aminopentylbicyclo[2,2,1]heptane, 2,5(6)-diaminoethylbicyclo[2,2,1]heptane, 2,5(6)-diaminopropylbicyclo[2,2,1]heptane, 2,5(6)-diaminobutylbicyclo[2,2,1]heptane, 2,5(6)-diaminopentylbicyclo[2,2,1]heptane, 5(6)-diaminomethylbicyclo[2,2,2]octane, 2-aminomethyl-5(6)-aminoethylbicyclo[2,2,2]octane, 2-aminomethyl-5(6)-aminopropylbicyclo[2,2,2]octane, 2-aminomethyl-5(6)-aminobutylbicyclo[2,2,2]octane, 2-aminomethyl-5(6)-aminopentylbicyclo[2,2,2]octane, 2,5(6)-aminoethylbicyclo[2,2,2]octane, 2,5(6)-diaminopropylbicyclo[2,2,2]octane, 2,5(6)-diaminobutylbicyclo[2,2,2]octane, 2,5(6)-diaminopentylbicyclo[2,2,1]octane, 3(4),8(9)-diaminomethyltricyclo[5,2,1,0$^{2,6}$]decane, 3(4)-aminomethyl-8(9)-aminoethyltricyclo[5,2,1,0$^{2,6}$]decane, 3(4)-aminomethyl-8(9)-aminopropyltricyclo[5,2,1,0$^{2,6}$]decane, 3(4)-aminomethyl-8(9)-aminobutyltricyclo[5,2,1,0$^{2,6}$]decane, 3(4)-aminomethyl-8(9)-aminopentyltricyclo[5,2,1,0$^{2,6}$]decane, 3(4),8(9)-diaminoethyltricyclo[5,2,1,0$^{2,6}$]decane, 3(4),8(9)-diaminopropyltricyclo[5,2,1,0$^{2,6}$]decane, 3(4),8(9)-diaminobutyltricyclo[5,2,1,0$^{2,6}$]decane, 3(4),8(9)-diaminopentyltricyclo[5,2,1,0$^{2,6}$]decane, 3(4),7(8)-diaminomethylbicyclo[4,3,0$^{1,6}$]nonane, 3(4)-aminomethyl-7(8)-aminoethylbicyclo[4,3,0$^{1,6}$]nonane, 3(4)-aminomethyl-7(8)-aminopropylbicyclo[4,3,0$^{1,6}$]nonane, 3(4)-aminomethyl-7(8)-aminobutylbicyclo[4,3,0$^{1,6}$]nonane, 3(4)-aminomethyl-7(8)-aminopentylbicyclo[4,3,0$^{1,6}$]nonane, 3(4),7(8)-diaminoethylbicyclo[4,3,0$^{1,6}$]nonane, 3(4),7(8)-diaminopropylbicyclo[4,3,0$^{1,6}$]nonane, 3(4),7(8)-diaminobutylbicyclo[4,3,0$^{1,6}$]nonane, 3(4),7(8)-diaminopentylbicyclo[4,3,0$^{1,6}$]nonane, 3-aminomethyl-3,5,5-trimethylcyclohexylamine, 1,2-diaminocyclohexane, 1,3-diaminocyclohexane, and 1,4-diaminocyclohexane. These alicyclic diamines can be used solely or in the form of the mixture of two or more kinds.

Of all the above described alicyclic diamines, preferably used are polycyclic aliphatic diamines having the following general formula [II]:

(II)

wherein m, n represent an integer from 1 to 5 independently.

It is considered that these alicyclic diamines impart thixotropy to the two-component type polyurethane composition obtained.

Desirably the alicyclic diamine content of the active hydrogen compounds is not less than 1% and not more than 50% by equivalent weight, preferably not less than 5% and not more than 40% by equivalent weight as active hydrogen group conversion on the basis of the total active hydrogen groups in the same compound. When the alicyclic diamine content is 1% by equivalent weight or more, the development of thixotropy is more remarkable and the fluid sagging (sag resistance) is more effectively prevented. And when the alicyclic diamine content is 50% by equivalent weight or less, the operation of curing polyurethane resins becomes easier.

(Chain Extender)

The chain extenders optionally used in curing agent (B) of the present invention are not limited to any specific types, and the types used in the preparation of conventional polyurethane resin compositions are applicable. These chain extenders include, for example, aromatic diamines such as 3,3'-dichloro-4,4'-diaminodiphenylmethane (MBOCA) and the polymeric compounds thereof, methylene dianiline (MDA) and the polymeric compounds thereof, diethyltoluene diamine (DETDA), and dimethylthiotoluene diamine.

(Catalyst)

The catalysts used in the reaction of a compound having an isocyanate group and an active hydrogen compound or in foaming of the present invention according to situations include, for example, organometallic catalysts including organotin compounds such as dibutyltin dilaurate, dioctyltin dimalate, stannous octoate and dibutyltin oxide, organotitunium compounds such as tetrabutyl titanate, organolead compounds such as lead naphthenate and lead octoate, and organobismuth compounds such as bismuth neodecanoate and bismuth octoate; and tertiary amines such as triethylenediamine, triethylamine, tetramethylenediamine, N-methylmorpholine, N,N-dimethylethanolamine and dimethylimidazoleamine. These catalysts can be used solely or in combination with one or more kinds. In addition, organic acids such as octanoic acid, oleic acid and o-toluic acid can also be used.

The amount of the above catalysts used may be properly set according to the intended physical properties of the desired products; generally the amount is 0.001 to 2 parts by mass per 100 parts by mass of the curing agent (B).

Method of Preparing Two-component Type Polyurethane Composition

The two-component type polyurethane composition according to the present invention can be obtained by mixing the principal component (A) containing the compound having an isocyanate group and the curing agent (B) containing the compound having active hydrogen (an active hydrogen compound).

The method of mixing is not limited to any specific one. The principal component (A) and the curing agent (B) may be mixed in any desired manner taking into account the fact that isocyanate and active hydrogen reacts immediately after mixing to form a crosslinked structure, causing the development of thixotropy.

The mixing ratio of the principal component (A) to the curing agent (B) maybe properly set according to situations; generally and desirably the amount of the curing agent (B) mixed is 5 to 300 parts by mass per 100 parts by mass of the principal component (A), preferably 10 to 280 parts by mass per 100 parts by mass of the principal component (A).

Two-component Type Micro Foamed Polyurethane Elastomer

The two-component type micro foamed polyurethane elastomer according to the present invention is obtained from the aforementioned principal component (A) containing a compound having an isocyanate group, the aforementioned curing agent (B) containing a compound having active hydrogen and a foaming agent, and both of the principal component (A), and the curing agent (B) contain substantially no thixotropic agent.

The total time immediately after the moment of mixing the principal component (A) and the curing agent (B) to the moment of the development of thixotropy is 2 seconds or shorter, preferably 1.5 seconds or shorter, and more preferably 1 second or shorter.

The slump of the mixture of the principal component and the curing agent is 3 mm or smaller, preferably 2 mm or smaller, more preferably 1 mm or smaller.

The above active hydrogen compounds have flash point of 60° C. or higher, preferably 65° C. or higher, and more preferably 70° C. or higher.

When boiling the two-component type micro foamed polyurethane elastomer, which is obtained by curing the above mixture, in boiling water under atmospheric pressure for 60 minutes, change in mass of the above two-component type micro foamed polyurethane elastomer before and after the boiling is 0.6% or smaller by mass, preferably 0.55% or smaller by mass.

Desirably the two-component type micro foamed polyurethane elastomer according to the present invention has preferably break strength of not less than 0.5 MPa and not more than 30 MPa at −30° C., more preferably not more than 25 MPa.

Desirably the two-component type micro foamed polyurethane elastomer according to the present invention has preferably elongation at break of not less than 20% and not more than 700% at −30° C., more preferably not less than 50% and not more than 600%, particularly preferably not less than 50% and not more than 500%.

Though the total density is not restricted to any specific one, desirably the two-component type micro foamed polyurethane elastomer according to the present invention has preferably a total density of 100 to 900 kg/m$^3$, more preferably 250 to 700 kg/m$^3$. The term "total density" used herein means the density of the two-component type micro foamed polyurethane elastomer including the surface layer portion and the inner center portion.

Desirably the average diameter of the cells of the two-component type micro foamed polyurethane elastomer according to the present invention is preferably 1 to 100 μm, more preferably 5 to 70 μm, and particularly preferably not more than 60 μm. When the average diameter of the above cells is 100 μm or smaller, since the tendency for the cell diameter to become coarse is restricted or prevented, two-component type micro foamed polyurethane elastomers having not only good touch, but enhanced mechanical properties can be obtained.

Desirably the two-component type micro foamed polyurethane elastomer according to the present invention has a constitutional unit having the following general formula [I]:

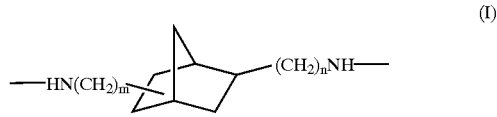

wherein m, n represent an integer from 1 to 5 independently, preferably in the rate of not less than 0.001% and not more than 30% by mass, more preferably in the rate of not less than 0.005% and not more than 25% by mass.

The cells of the two-component type micro foamed polyurethane elastomer according to the present invention may be closed cells, open cells or the mixture thereof; however, those having a high closed cell rate are desirable. The closed cell rate is, for example, preferably 15% or higher, more preferably 30% or higher, and particularly preferably 60% or higher.

Preferably the two-component type micro foamed polyurethane elastomer has a skin layer (a layer having no cells) on its surface.

Foaming Agent

As a foaming agent, any of the chemical and physical foaming agents may be used as long as it can form a two-component type micro foamed polyurethane elastomer. However, water, carbon dioxide gas, liquefied carbon dioxide gas and the mixture thereof is preferable. These foaming agents can be used solely or in combination with one or more kinds.

(Chemical Foaming Agent)

As a chemical foaming agent, water is preferably used. Water can be used as a chemical foaming agent because it reacts with polyisocyanate to produce carbon dioxide gas. Generally and desirably, the amount of the chemical foaming agent, such as water, used is preferably not less than 0.05 parts and not more than to 5 parts by mass, more preferably not less than 0.1 part by mass, per 100 parts by mass of the total amount of the active hydrogen compounds contained in the curing agent (B), such as polyol and/or polyol with the polymer fine particles obtained by the radical polymerization of compounds having unsaturated bond dispersed therein and alicyclic diamine, etc.

(Physical Foaming Agent)

As a physical foaming agent, chlorofluorocarbons which have been developed so as to protect the global environment, hydroxychlorofluorocarbons (HCFC-134a etc.), hydrocarbons (cyclopentane etc.), carbon dioxide gas, liquefied carbon dioxide gas, and other foaming agents as foaming auxiliary are used solely or in combination with water. Of all the above agents, preferably used are carbon dioxide gas and liquefied carbon dioxide gas, and more preferably liquefied carbon dioxide gas, in view of the load on the global environment and of the fact that the density of polyurethane foam can be drastically changed by slightly changing its amount added.

Generally and desirably, the amount of the above physical foaming agents used is preferably not less than 0.01 part and not more than 3 parts by mass, more preferably not less than 0.05 part and not more than 2.5 parts by mass, and particularly preferably not less than 0.1 part and not more than 2.0 parts by mass per 100 parts by mass of the total amount of the active hydrogen compounds contained in the curing agent (B), such as polyol and/or polyol with the polymer fine particles obtained by the radical polymerization of compounds having unsaturated bond dispersed therein and alicyclic diamine, etc.

Method of Producing Two-Component Type Micro Foamed Polyurethane Elastomer

The two-component type micro foamed polyurethane elastomer according to the present invention can be produced by mixing the aforementioned principal component (A) containing a compound having an isocyanate group, curing agent (B) containing active hydrogen and foaming agent, and foaming the mixture thereof. In addition to the principal component (A), the curing agent (B) and the foaming agent, the two-component type micro foamed polyurethane elastomer may contain a chain extender, a urethane catalyst, a foam stabilizer, etc. according to situations.

Preferably mixing and agitation are performed using a low pressure or high pressure circulating foam molding machine preferably at the temperature range of 0 to 100° C., and more preferably at the temperature range of 5 to 60° C., though the molding temperature is not restricted to any specific one.

Raw Materials for Producing Two-Component Type Micro Foamed Polyurethane Elastomer The same principal component (A) and curing agent (B) as used for producing the aforementioned two-component type polyurethane composition can be used as a principal component (A) and curing material (B) of the two-component type micro foamed polyurethane elastomer according to the present invention.

Polyurethane Sealant and Process of Producing the Same

The polyurethane sealant according to the present invention is the sealant containing a two-component type polyurethane composition obtained from the principal component (A) containing the compound having an isocyanate group and the curing agent (B) containing the compound having active hydrogen, or the sealant containing a two-component type micro foamed polyurethane elastomer obtained from the principal component (A) containing the compound having an isocyanate group and the curing agent (B) containing the compound having active hydrogen and a foaming agent. It is obtained by mixing the principal component (A) and the curing agent (B) (and the foaming agent, in the case of a sealant containing the two-component type micro foamed polyurethane elastomer), and in addition, optionally additives such as filler, plasticizer, age resister, ultraviolet absorber, light stabilizer, antioxidant, coloring materials such as pigment and dye, and dispersant, according to situations.

Immediately after mixing, the compound having an isocyanate group and the compound having active hydrogen such as alicyclic diamine react with each other, form a crosslinked structure, causing the development of thixotropy. This sealant can be used as a foamed sealing material by the addition of a foam stabilizer and a foaming agent.

Although the sealant obtained in this manner may be applied to its object using a special applicator, generally it is directly applied to its object right after mixing.

As the agitating and mixing equipment for producing the above described polyurethane sealant according to the present invention, metering pumps such as gear pump, plunger pump in combination with a throttle valve can be used for pumping the raw materials and a mechanical rotary mixer, static mixer, etc. can be used for mixing, in addition to the hand-application using a conventional caulking gun.

Since the two-component type polyurethane composition according to the present invention promptly develops thixotropy, the efficiency of the operations such as agitation and mixing can be remarkably increased by the use of a high-pressure pump in combination with an impact type mixing gun.

In the production of the polyurethane sealant according to the present invention, the mixing ratio of the principal component (A) to the curing agent (B) can be properly set according to situations; however, generally and desirably the amount of the curing agent (B) used is not less than 5 parts and not more than 300 parts by weight, preferably not less than 10 parts and not more than 280 parts per 100 parts by weight of the principal component (A).

Effect of the Invention

The two-component type polyurethane composition or the two-component type micro foamed polyurethane elastomer according to the present invention develops excellent thixotropy immediately after mixing a principal component containing a compound having an isocyanate group and a curing material containing a compound having active hydrogen (and the foaming agent, in the case of the two-component type micro foamed polyurethane elastomer), thereby enables its application under a variety of conditions such as mechanical-application and hand-application. In addition, it has excellent sag resistance and physical properties suitable for a sealing material. Because of the characteristics described above, the polyurethane sealant containing the above two-component type polyurethane composition or two-component type micro foamed polyurethane elastomer has excellent workability.

EXAMPLES

The present invention will be further described with reference to the examples and comparative examples shown below; however, it should be understood that these examples are shown for illustrative purposes only and are not intended to limit the present invention. Unless otherwise stated, [%] used herein is on the mass basis.
(Preparation of Component)

Preparation Example 1

Preparation of Prepolymer (A-1)

A separable flask equipped with an agitator was charged with 657.1 g of Diol-3000 (polyoxypropylene diol having an average molecular weight of 3000, manufactured by Mitsui Chemical Inc.), 222.0 g of MN-4000 (polyoxypropylene triol having an average molecular weight of 4000, manufactured by Mitsui Chemical Inc.) and 120.9 g of TDI-80 (tolylene diisocyanate of which 2,4-isomer/2,6-isomer ratio is 80/20, manufactured by Mitsui Chemical Inc.). They were allowed to react under the nitrogen gas flow at 80° C. for 4 hours, subjected to maturing at room temperature for 1 day, so as to obtain isocyanate-terminated urethane prepolymer (A-1) of which NCO%=3.0.

Preparation Example 2

Preparation of Prepolymer (A-2)

The same type of equipment as used for preparing the prepolymer A-1 in the above preparation example 1 was charged with 359.7 g of Diol-2000 (polyoxypropylene diol having an average molecular weight of 2000, manufactured by Mitsui Chemical Inc.), 40.3 g of MN-3050 (polyoxypropylene triol having an average molecular weight of 3000, manufactured by Mitsui Chemical Inc.), 300.0 g of MDI-PH (MDI, manufactured by Mitsui Chemical Inc.) and 300.0 g of MDI-LK (carbodiimide modified MDI, NCO%= 28.3, manufactured by Mitsui Chemical Inc.). They were allowed to react under the nitrogen gas flow at 80° C. for 4 hours, subjected to maturing at room temperature for 1 day, so as to obtain isocyanate-terminated urethane prepolymer (A-2) of which NCO%=12.0.

Preparation Example 3

Preparation of prepolymer (A-3)

An isocyanate-terminated urethane prepolymer (A-3) of which NCO%=28.0 was obtained in the same manner as in the above preparation example 2, except that 75.2 g of Diol-2000, 8.4 g of MN-3050, 458.21 g of MDI-PH and 458.21 g of MDI-LK were used.

Preparation Example 4

Preparation of Curing Agent (B-1)

A separable flask equipped with an agitator was charged with 521.42 g of Diol-2000 (flashpoint of not less than 200° C.), 463.41 g of MN-3050 (flash point of not less than 200° C.), 13.39 g of the mixture of 2,5-diaminomethylbicyclo[2, 2,1]heptane and 2,6-diaminomethylbicyclo[2,2,1]heptane (NBDA, another name: norbornane diamine, manufactured by Mitsui Chemical Inc., flash point of 134° C.) and 1.79 g of Minico P-24 (Harima Chemicals, Inc.), and the mixture was agitated for 1 hour, so as to obtain a curing agent (B-1).

Preparation Example 5

Preparation of Curing Agent (B-2)

A curing agent (B-2) was obtained in the same manner as in the preparation example 4, except that 471.11 g of Diol-2000, 471.11 g of MN-3050, 4.03 g of NBDA and 1.61 g of Minico P-24 were used.

Preparation Example 6

Preparation of Curing Agent (B-3)

A curing agent (B-3) was obtained in the same manner as in the preparation example 4, except that 559.48 g of Diol-2000, 372.99 g of MN-3050, 64.66 g of NBDA and 2.87 g of Minico P-24 were used.

Preparation Example 7

Preparation of Curing Agent (B-4)

The same type of equipment as used for preparing the curing agent B-1 in the above preparation example 4 was charged with 423.80 g of Diol-400 (polyoxypropylene diol having an average molecular weight of 400, manufactured by Mitsui Chemical Inc., flash point of not less than 200° C.), 550.80 g of MN-700 (polyoxypropylene triol having an average molecular weight of 700, manufactured by Mitsui Chemical Inc., flash point of not less than 200° C. or higher), 18.14 g of NBDA and 7.26 g of Minico P-24, and the mixture was agitated for 1 hour, so as to obtain a curing agent (B-4).

Preparation Example 8

Preparation of Curing Agent (B-5)

The same type of equipment as used for preparing the curing agent B-1 in the above preparation example 4 was charged with 452.59 g of Diol-2000, 452.59 g of MN-3050, 87.16 g of dimethylthiotoluene diamine (trade name: Ethacure #300, manufactured by Albemarle, flash point of 176° C.) as chain extender, 6.97 g of NBDA and 0.70 g of Minico P-24, and the mixture was agitated for 1 hour, so as to obtain a curing agent (B-5).

Preparation Example 9

Preparation of Curing Agent (B-6)

A curing agent (B-6) was obtained in the same manner as in the preparation example 8, except that 434.69 g of Diol-2000, 434.69 g of MN-3050, 104.66 g of dimethylthiotoluene diamine (Ethacure #300), 25.12 g of NBDA and 0.84 g of Minico P-24 were used.

Preparation Example 10

Preparation of Curing Agent (B-7)

A curing agent (B-7) was obtained in the same manner as in the above preparation example 4, except that 256.37 g of Diol-2000, 683.72 g of MN-3050, 59.25 g of NBDA and 0.66 g of Minico P-24 were used.

Preparation Example 11

Preparation of Curing Agent (B-8)

The same type of equipment as used for preparing the curing agent B-1 in the above preparation example 4 was charged with 999.058 g of MN-5000 (polyoxypropylene triol having an average molecular weight of 5000, manufactured by Mitsui Chemicals, Inc.), 0.018 g of NBDA, 0.924 g of Minico P-24, and the mixture was agitated for 1 hour, so as to obtain a curing agent (B-8).

Preparation Example 12

Preparation of Curing Agent (B-9)

The same type of equipment as used for preparing the curing agent B-1 in the above Preparation Example 4 was charged with 96.68 g of Diol-2000, 96.68 g of MN-3050, 805.04 g of 3-aminomethyl-3,5,5-trimethylcyclohexylamine (IPDA, another name: isophorone diamine, manufactured by Huls, flash point of 112° C.) and 1.60 g of Minico P-24, and the mixture was agitated for 1 hour, so as to obtain a curing agent (B-9).

Preparation Example 13

Preparation of Curing Agent (B-10)

The same type of equipment as used for preparing the curing agent B-1 in the above preparation example 4 was charged with 449.34 g of Diol-2000, 399.35 g of MN-3050, 149.77 g of Jeffamine D-2000 (polyoxypropylene diamine having an average molecular weight of 2000, manufactured by Sun Techno Chemical, flash point of not less than 200° C.) as a thixotropic agent, and 1.54 g of Minico P-24, and the mixture was agitated for 1 hour, so as to obtain a curing agent (B-10).

Preparation Example 14

Preparation of Curing Agent (B-11)

The same type of equipment as used for preparing the curing agent B-1 in the above preparation example 4 was charged with 526.22 g of Diol-2000, 466.64 g of MN-3050, 5.34 g of ethanolamine (flash point of 85° C. (closed)) and 1.80 g of Minico P-24, and the mixture was agitated for 1 hour, so as to obtain a curing agent (B-11).

Preparation Example 15

Preparation of Curing Agent (B-12)

A curing agent (B-12) was obtained in the same manner as in the above preparation example 14, except that 526.93 g of Diol-2000, 467.27 g of MN-3050, 5.35 g of ethanolamine and 0.45 g of Minico P-24 were used.

Preparation Example 16

Preparation of Curing Agent (B-13)

The same type of equipment as used for preparing the curing agent B-1 in the above preparation example 4 was charged with 525.61 g of Diol-2000, 466.11 g of MN-3050, 6.48 g of 1,2-propanediamine (flash point of 49° C. (closed)) and 1.80 g of Minico P-24, and the mixture was agitated for 1 hour, so as to obtain a curing agent (B-13).

Preparation Example 17

Preparation of Curing Agent (B-14)

A curing agent (B-14) was obtained in the same manner as in the above preparation example 16, except that 526.33 g of Diol-2000, 466.74 g of MN-3050, 6.48 g of 1,2-propanediamine and 0.45 g of Minico P-24 were used.

Preparation Example 18

Preparation of Curing Agent (B-15)

A curing agent (B-15) was obtained in the same manner as in the above preparation example 4, except that 522.66 g of Diol-2000, 463.49 g of MN-3050, 13.40 g of NBDA and 0.45 g of Minico P-24 were used.

(Evaluation and Testing Method)

Thixotropy developing time, workability, sag resistance (slump), hydroxyl value, total density, average diameter of cells of two-component type micro foamed polyurethane elastomer, beak strength, elongation at break and flash point were measured in the following manner.

(1) Thixotropy Developing Time

Pre-determined amounts of chief agent (A) and curing agent (B) were weighed, put in a beaker, and agitated with a spatula. Then the thixotropy developing time was measured.

(2) Workability

The workability of liquid mixtures was evaluated as "○" when they could be spread with a spatula during the development of thixotropy and as "X" when they could not be spread or were hard to spread with a spatula during the development of thixotropy.

(3) Sag Resistance (Slump)

Sag resistance (slump) was evaluated in accordance with the "slump test" method described in JIS A 1439 (testing method for sealing materials for building). The test was conducted at 23° C. in such a manner as to apply the liquid mixtures, which had already developed thixotropy, to the slump test equipment for sealing materials which was vertically set up and observe the sagging of the mixtures.

(4) Waterproof Test

Waterproof test was conducted in accordance with the "water permeability test" described in JIS A-6910 (multiple-layer top coat). The specimens were prepared by applying sealer to 5 mm thickness on a polyester spun bonded fabric (H50901, thickness=0.31 mm, basis weight=90 g/m$^2$, air permeability=120 cc/cm$^2$/sec) manufactured by Toray Industries, Inc., as a substrate, and subjecting the substrate with sealer to aging at 25° C. for 14 days. Then a funnel was set up on the surface of the sealer and its periphery was fixed with a silicon sealant, after which the test was conducted with head set at 250 mm. The waterproofness was evaluated as "○" when the head was 230 mm or higher, as "Δ" when the head was 200 to 229 mm, and as "X" when the head was lower than 200 mm.

<Analytical Method of Polyether Polyol>

(5) Hydroxyl Value (OHV, unit: mgKOH/g), Total Unsaturation Degree (unit: meq./g)

Hydroxyl value was measured in accordance with the method described in JIS K-1557. As the number of the hydroxyl groups of polyether polyol, used was the number of the hydroxyl groups of the active hydrogen compound used as an initiator.

<Method of Evaluating Physical Properties of Two-component Type Polyurethane Elastomer>

A sample of size of 3 mm (in thickness)×300 mm (in width) 300 mm (in length) taken from the two-component type micro foamed polyurethane elastomer was used for evaluating the physical properties.

(6) Total Density (unit: kg/mB)

Total density was measured by the "underwater substitution method" utilizing the difference in weight between in-water and in-air, that is, "buoyancy" in accordance with the following formula:

$$\text{Total density} = m\rho/(m-\omega)$$

wherein m: mass of object, ρ: density of water, ωg: mass of object in water, g: gravitational acceleration.

(7) Average Diameter of Cells of Two-Component Type Micro Foamed Polyurethane Elastomer (unit: μm)

A sample of size of 3 cm in length and 1 cm in width was cut out from the center portion of the two-component type micro foamed polyurethane elastomer, the cell diameter was observed with a micro camera (MICRO CCD SCOPE/CCD-F2 manufactured by Shimadzu Corporation), and the average cell diameter was obtained with an image processing analyzer.

(8) Break Strength and Elongation at Break at −30° C.

Break strength and elongation at break were measured with a universal tensile tester (TENSHIRON BANNOUSHIKENKI RTA-500) equipped with a furnace capable of retaining the temperature of a sample at a travel speed of 500 mm/min between the grip jaws. The measurement was conducted in 30 minutes after the temperature of the furnace loaded with a sample reached −30° C.

(9) Measurement of Flash Point

The flash points shown with "(closed)" indicate the values obtained by the closed up flash test and the others the values obtained by the open flash test. Generally, flash points are first measured by the closed up flash test, and when the measured values are 80° C. or lower, these closed up values are adopted as flash points. When flash points cannot be recorded by the closed up flash test, they are measured by the open flash test and the results are adopted as flash points. The flash point was evaluated as "○" when the flash points of the active hydrogen compounds were all 60° C. or higher, and as "X" when the active hydrogen compound which flash point was lower than 60° C. was included.

Example 1

100.0 parts by weight of (A-1), as a prepolymer of the principal component (A), and 56.0 parts by weight of (B-1), as a curing agent (B), were mixed. The alicyclic diamine content of the active hydrogen compounds contained in the curing agent (B) was 15% by equivalent weight as active hydrogen group conversion.

The thixotropy developing time (second), slump (mm), weight change before/after boiling (% by mass), workability, break strength (MPa) and elongation at break (%) were evaluated of the obtained polyurethane composition in accordance with the method described above.

The development of thixotropy was observed within 1 second after the moment of mixing. The sag resistant test conducted with slump test equipment showed such a good result that the sagging was 0 mm. The spreading operation with a spatula could be carried out satisfactorily after the development of thixotropy. These evaluation results are shown in Table 1.

Example 2

100.0 parts by weight of (A-1), as a prepolymer of the principal component (A), and 62.0 parts by weight of (B-2), as a curing agent (B), were mixed. The alicyclic diamine content of the active hydrogen compounds contained in the curing agent was 5% by equivalent weight as active hydrogen group conversion.

The thixotropy developing time (second), slump (mm), weight change before/after boiling (% by mass), workability, break strength (MPa) and elongation at break (%) were evaluated of the obtained polyurethane composition in accordance with the method described above.

The development of thixotropy was observed 2 seconds after the moment of mixing. The sag resistant test conducted with slump test equipment showed such a good result that the sagging was smaller than 1 mm. The spreading operation with a spatula could be carried out satisfactorily after the development of thixotropy. These evaluation results are shown in Table 1.

Example 3

100.0 parts by weight of (A-1), as a prepolymer of the principal component (A), and 34.8 parts by weight of (B-3), as a curing agent (B), were mixed. The alicyclic diamine content of the active hydrogen compounds contained in the curing agent (B) was 45% by equivalent weight as active hydrogen group conversion.

The thixotropy developing time (second), slump (mm), weight change before/after boiling (% by mass), workability, break strength (MPa) and elongation at break (%) were evaluated of the obtained polyurethane composition in accordance with the method described above.

The development of thixotropy was observed within 1 second after the moment of mixing. The sag resistant test conducted with slump test equipment showed such a good result that the sagging was 0 mm. The spreading operation with a spatula could be carried out satisfactorily after the development of thixotropy. These evaluation results are shown in Table 1.

Example 4

100.0 parts by weight of (A-1), as a prepolymer of the principal component (A), and 13.8 parts by weight of (B-4), as a curing agent (B), were mixed. The alicyclicdiamine content of the active hydrogen groups contained in the curing agent was 5% by equivalent weight.

The thixotropy developing time (second), slump (mm), weight change before/after boiling (% by mass), workability, break strength (MPa) and elongation at break (%) were evaluated of the obtained polyurethane composition in accordance with the method described above.

The development of thixotropy was observed within 1 second after the moment of mixing. The sag resistant test conducted with slump test equipment showed such a good result that the sagging was 0 mm. The spreading operation with a spatula could be carried out satisfactorily after the development of thixotropy. These evaluation results are shown in Table 1.

Example 5

100.0 parts by weight of (A-2), as a prepolymer of the principal component (A), and 143.4 parts by weight of (B-5), as a curing agent (B), were mixed. The alicyclic diamine content of the active hydrogen compounds contained in the curing agent was 5% by equivalent weight as active hydrogen group conversion.

The thixotropy developing time (second), slump (mm), weight change before/after boiling (% by mass), workability, break strength (MPa) and elongation at break (%) were evaluated of the obtained polyurethane composition in accordance with the method described above.

The development of thixotropy was observed within 1 second after the moment of mixing. The sag resistant test conducted with slump test equipment showed such a good result that the sagging was 0 mm. The spreading operation with a spatula could be carried out satisfactorily after the development of thixotropy. These evaluation results are shown in Table 1.

TABLE 1

|  | Example 1 | | Example 2 | | Example 3 | | Example 4 | | Example 5 | |
| --- | --- | --- | --- | --- | --- | --- | --- | --- | --- | --- |
| Principal component (Isocyanate Prepolymer) (parts by mass) | A-1 | 100.0 | A-1 | 100.0 | A-1 | 100.0 | A-1 | 100.0 | A-2 | 100.0 |
| Curing Agent (parts by mass) | B-1 | 56.0 | B-2 | 62.0 | B-3 | 34.8 | B-4 | 13.8 | B-5 | 143.4 |
| Aliphatic Diamine Content (% by equivalent weight) | 15 | | 5 | | 45 | | 5 | | 5 | |
| Thixotropy developing time (second) | within 1 second | | 2 seconds | | within 1 second | | within 1 second | | within 1 second | |
| Slump (mm) | 0 mm | | less than 1 mm | | 0 mm | | 0 mm | | 0 mm | |

TABLE 1-continued

|  | Example 1 | Example 2 | Example 3 | Example 4 | Example 5 |
|---|---|---|---|---|---|
| Weight Change before/after Boiling (% by mass) | 0.45 | 0.34 | 0.31 | 0.29 | 0.51 |
| Workability | ○ | ○ | ○ | ○ | ○ |
| Flash Point | ○ | ○ | ○ | ○ | ○ |
| Break Strength (MPa) | 3.6 | 1.8 | 3.3 | 3.6 | 8.3 |
| Elongation at Break (%) | 400 | 510 | 330 | 390 | 110 |

Example 6

100.0 parts by weight of (A-2), as a prepolymer of the principal component (A), and 119.4 parts by weight of (B-6) as a curing agent (B), were mixed. The alicyclic diamine content of the active hydrogen compounds contained in the curing agent was 15% by equivalent weight as active hydrogen group conversion.

The thixotropy developing time (second), slump (mm), weight change before/after boiling (% by mass), workability, break strength (MPa) and elongation at break (%) were evaluated of the obtained polyurethane elastomer in accordance with the method described above.

The development of thixotropy was observed within 1 second after the moment of mixing. The sag resistant test conducted with slump test equipment showed such a good result that the sagging was 0 mm. The spreading operation with a spatula could be carried out satisfactorily after the development of thixotropy. These evaluation results are shown in Table 2.

Example 7

100.0 parts by weight of (A-2), as a prepolymer of the principal component (A), and 151.9 parts by weight of (B-7), as a curing agent (B), were mixed. The alicyclic diamine content of the active hydrogen compounds contained in the curing agent was 45% by equivalent weight as active hydrogen group conversion.

The thixotropy developing time (second), slump (mm), weight change before/after boiling (% by mass), workability, break strength (MPa) and elongation at break (%) were evaluated of the obtained polyurethane elastomer in accordance with the method described above.

The development of thixotropy was observed within 1 second after the moment of mixing. The sag resistant test conducted with slump test equipment showed such a good result that the sagging was 0 mm. The spreading operation with a spatula could be carried out satisfactorily after the development of thixotropy. These evaluation results are shown in Table 2.

Example 8

100.0 parts by weight of (A-2), as a prepolymer of the principal component (A), and 223.8 parts by weight of (B-15), as a curing agent (B), were mixed. The alicyclic diamine content of the active hydrogen compounds contained in the curing agent (B) was 15% by equivalent weight as active hydrogen group conversion.

The thixotropy developing time (second), slump (mm), weight change before/after boiling (% by mass), workability, break strength (MPa) and elongation at break (%) were evaluated of the obtained polyurethane elastomer in accordance with the method described above.

The development of thixotropy was observed within 1 second after the moment of mixing. The sag resistant test conducted with slump test equipment showed such a good result that sagging was 0 mm.

The weight change after boiling was as good as 0.33%. The spreading operation with a spatula could be carried out without causing any problems after the development of thixotropy. These evaluation results are shown in Table 2.

Comparative Example 1

100.0 parts by weight of (A-1), as a prepolymer of the principal component (A), and 108.2 parts by weight of (B-8), as a curing agent (B), were mixed. The alicyclic diamine content of the active hydrogen compounds contained in the curing agent was 0.04% by equivalent weight as active hydrogen group conversion.

The thixotropy developing time (second), slump (mm), weight change before/after boiling (% by mass), workability, break strength (MPa) and elongation at break (%) were evaluated of the obtained polyurethane (composition) in accordance with the method described above.

The development of thixotropy was not satisfactory even 3 minutes or longer after the moment of mixing. The sagging could not be measured by the sag resistant test conducted with slump test equipment because the fluid sagged down. These evaluation results are shown in Table 3.

Comparative Example 2

100.0 parts by weight of (A-3), as a prepolymer of the principal component (A), and 62.7 parts by weight of (B-9), as a curing agent (B), were mixed. The alicyclicdiamine content of the active hydrogen compounds contained in the curing agent was 98% by equivalent weight as active hydrogen group conversion.

The thixotropy developing time (second), slump (mm), weight change before/after boiling (% by mass), workability, break strength (MPa) and elongation at break (%) were evaluated of the obtained polyurethane (composition) in accordance with the method described above.

The resin was solidified immediately after the moment of mixing and could not be agitated. Accordingly the spreading operation with a spatula could not be carried out. These evaluation results are shown in Table 3.

Comparative Example 3

100.0 parts by weight of (A-1), as a prepolymer of the principal component (A), and 65.0 parts by weight of (B-10), as a curing agent (B), were mixed. The diamine content of the active hydrogen compounds contained in the curing agent was 15% by equivalent weight as active hydrogen group conversion.

The thixotropy developing time (second), slump (mm), weight change before/after boiling (% by mass) workability, break strength (MPa) and elongation at break (%) were evaluated of the obtained polyurethane (composition) in accordance with the method described above.

The development of thixotropy took about 1 minute after the moment of mixing. The sag resistant test conducted with slump test equipment showed such a unsatisfactory result that the sagging was 4 mm. The spreading operation with a spatula could be carried out without causing any problems after the development of thixotropy. These evaluation results are shown in Table 3.

Comparative Example 4

100.0 parts by weight of (A-1), as a prepolymer of the principal component (A), and 55.6 parts by weight of (B-11), as a curing agent (B), were mixed. The alkanol diamine content of the active hydrogen compounds contained in the curing agent (B) was 15% by equivalent weight as active hydrogen group conversion.

The thixotropy developing time (second), slump (mm), weight change before/after boiling (% by mass), workability, break strength (MPa) and elongation at break (%) were evaluated of the obtained polyurethane (composition) in accordance with the method described above.

The development of thixotropy took 2 seconds after the moment of mixing. The sag resistant test conducted with slump test equipment showed that the sagging was 2 mm.

The spreading operation with a spatula could be carried out without causing any problems after the development of thixotropy. However, it was shown that the weight change after boiling test was as large as 5%, the reaction curing was unsatisfactory, and that waterproofness was a problem. These evaluation results are shown in Table 3.

Comparative Example 5

100.0 parts by weight of (A-2), as a prepolymer of the principal component (A), and 222.0 parts by weight of (B-12), as a curing agent (B), were mixed. The alkanol diamine content of the active hydrogen compounds contained in the curing agent (B) was 15% by equivalent weight as active hydrogen group conversion.

The thixotropy developing time (second), slump (mm), weight change before/after boiling (% by mass), workability, break strength (MPa) and elongation at break (%) were evaluated of the obtained polyurethane (composition) in accordance with the method described above.

The development of thixotropy took 2 seconds after the moment of mixing. The sag resistant test conducted with slump test equipment showed that the sagging was 1 mm.

The spreading operation with a spatula could be carried out without causing any problems after the development of thixotropy. However, it was shown that the weight change after boiling test was as large as 1.0%, the reaction curing was unsatisfactory, and that the waterproofness was-a problem. These evaluation results are shown in Table 3.

Comparative Example 6

100.0 parts by weight of (A-1), as a prepolymer of the principal component (A), and 55.6 parts by weight of (B-13), as a curing agent (B), were mixed. The aliphatic diamine content of the active hydrogen compounds contained in the curing agent (B) was 15% by equivalent weight as active hydrogen group conversion.

The thixotropy developing time (second), slump (mm), weight change before/after boiling (% by mass), workability, break strength (MPa) and elongation at break (%) were evaluated of the obtained polyurethane (composition) in accordance with the method described above.

The development of thixotropy took 2 seconds after the moment of mixing. The sag resistant test conducted with slump test equipment showed such a result that the sagging was as small as less than 1 mm.

The spreading operation with a spatula could be carried out without causing any problems after the development of thixotropy. Further the change in weight after boiling test was 0.35%. However, the polyurethane (composition) needs many instruments for safety treating, because the flash point of 1,2-propanediamine is as low as 49° C. In addition, the curing agent gave off an amine smell. These evaluation results are shown in Table 3.

Comparative Example 7

100.0 parts by weight of (A-2), as a prepolymer of the principal component (A), and 222.3 parts by weight of (B-14), as a curing agent (B), were mixed. The aliphatic diamine content of the active hydrogen compounds contained in the curing agent (B) was 15% by equivalent weight as active hydrogen group conversion.

The thixotropy developing time (second), slump (mm), weight change before/after boiling (% by mass), workability, break strength (MPa) and elongation at break (%) were evaluated of the obtained polyurethane (composition) in accordance with the method described above.

The development of thixotropy took 2 seconds after the moment of mixing. The sag resistant test conducted with slump test equipment showed such a result that the sagging was 0 mm.

The spreading operation with a spatula could be carried out without causing any problems after the development of thixotropy. Further the change in weight after boiling test was 0.33%. However, the polyurethane (composition) needs many instruments for safety treating, because the flash point of 1,2-propanediamine is as low as 49° C. In addition, the curing agent gave off an amine smell. These evaluation results are shown in Table 3.

TABLE 2

| | Example 6 | | Example 7 | | Example 8 | |
| --- | --- | --- | --- | --- | --- | --- |
| Principal component (Isocyanate Prepolymer) (parts by mass) | A-2 | 100.0 | A-2 | 100.0 | A-2 | 100.0 |
| Curing Agent (parts by mass) | B-6 | 119.4 | B-7 | 151.9 | B-15 | 223.8 |
| Aliphatic Diamine Content (% by equivalent weight) | 15 | | 45 | | 15 | |
| Thixotropy developing time (second) | within 1 second | | within 1 second | | within 1 second | |
| Slump (mm) | 0 mm | | 0 mm | | 0 mm | |
| Weight Change before/after Boiling (% by mass) | 0.23 | | 0.28 | | 0.33 | |
| Workability | ◯ | | ◯ | | ◯ | |
| Flash Point | ◯ | | ◯ | | ◯ | |
| Break Strength (MPa) | 17.3 | | 10.6 | | 20.7 | |
| Elongation at Break (%) | 160 | | 55 | | 260 | |

TABLE 3

|  | Comparative Example 1 | | Comparative Example 2 | | Comparative Example 3 | | Comparative Example 4 | | Comparative Example 5 | | Comparative Example 6 | | Comparative Example 7 | |
|---|---|---|---|---|---|---|---|---|---|---|---|---|---|---|
| Principal component (Isocyanate Prepolymer) (parts by mass) | A-1 | 100.0 | A-3 | 100.0 | A-1 | 100.0 | A-1 | 100.0 | A-2 | 100.0 | A-1 | 100.0 | A-2 | 100.0 |
| Curing Agent (parts by mass) | B-8 | 108.2 | B-9 | 62.7 | B-10 | 65.0 | B-11 | 55.6 | B-12 | 222.0 | B-13 | 55.6 | B-14 | 222.3 |
| Aliphatic Diamine Content (% by equivalent weight) | 0.04 | | 98 | | 15 | | 15 | | 15 | | 15 | | 15 | |
| Thixotropy developing time (second) | Over 180 seconds | | Immediately solidified | | About 60 seconds | | 2 seconds | | 2 seconds | | 2 seconds | | 2 seconds | |
| Slump (mm) | Fluid sagged. Un-measurable | | Un-measurable | | 4 mm | | 2 mm | | 1 mm | | less than 1 mm | | 0 mm | |
| Weight Change before/after Boiling (% by mass) | 0.57 | | 0.26 | | 0.33 | | 5 | | 1.0 | | 0.35 | | 0.33 | |
| Workability | Un-measurable | | Un-measurable | | ◯ | | ◯ | | ◯ | | ◯ | | ◯ | |
| Flash Point | ◯ | | ◯ | | ◯ | | ◯ | | ◯ | | x | | x | |
| Break Strength (MPa) | 8.6 | | Un-measurable | | 2.1 | | 1.4 | | 12.6 | | 2.7 | | 19.2 | |
| Elongation at Break (%) | 350 | | Un-measurable | | 470 | | 450 | | 380 | | 440 | | 200 | |

(Preparation of Component)

Preparation Example 19

Preparation of Sealing Curing Agent (SB-1)

A two-liter planetary mixer was charged with 119. 9 g of di-isononyl phthalate and 600.0 g of calcium carbonate, and the mixture was kneaded at ordinary temperature for 20 minutes. Then it was charged with 280.1 g of the curing agent (B-1) used in the example 1, followed by kneading at ordinary temperature for 20 minutes, so as to obtain a sealing curing agent (SB-1).

Preparation Example 20

Preparation of Sealing Curing Agent (SB-2)

A two-liter dissolver was charged with 1.67 g of foam stabilizer L-5420 (Nippon Unicar Co., Ltd.) and 998.37 g of the curing agent (B-6) used in the example 6, and the mixture was kneaded at ordinary temperature for 20 minutes, so as to obtain a sealing curing agent (SB-2).

Preparation Example 21

Preparation of Sealing Curing Agent (SB-3)

A sealing curing agent (SB-3) was obtained in the same manner as in the case of SB-1 of Preparation Example 19,. except that 75.0 g of di-isononyl phthalate and 325.0 g of the curing agent (B-10) instead of the curing agent (B-1) were used.

Example 9

100.0 parts by weight of the prepolymer (A-1), as a principal component (A), and 200.0 parts by weight of the sealing curing agent (SB-1) prepared in the Preparation Example 19, as a curing agent (B), were mixed and molded with a machine manufactured by Toho Machine Co., Ltd. (gear pumping, mechanical mixing head/solvent cleaning type).

The thixotropy developing time (second), slump (mm), weight change before/after boiling (% by mass), workability, break strength (MPa), elongation at break (%) and waterproofness were evaluated of the obtained polyurethane sealant in accordance with the method described above.

The development of thixotropy was observed within 1 second after the moment of ejecting the sealant. The sag resistant test conducted with slump test equipment showed such a good result that sagging was 0 mm. The spreading operation with a spatula could be carried out satisfactorily after the development of thixotropy. And the waterproof test showed that the head was 245 mm; accordingly the waterproofness was evaluated as "◯". These evaluation results are shown in Table 4.

Example 10

100.0 parts by weight of the prepolymer (A-2), as a principal component (A), and 120.0 parts by weight of the sealing curing agent (SB-2) prepared in the Preparation Example 20, as a curing agent (B), were mixed and molded with a high-pressure foaming machine, NR210 type, (axial piston high-pressure pump, mechanical cleaning, without solvent, by getting impact-mixing type mixing head/rod in and out) manufactured by Toho Machine Co., Ltd., so as to prepare a foamed sealing material using carbon dioxide gas. Carbon dioxide gas was added under pressure using a three-plunger pump in an amount of 0.2 wt % of the total amount of the above prepolymer (A-2) and the above sealing curing agent (SB-2) right before the mixing head.

Since the curing agent line was charged with carbon dioxide gas, the fluid ejected from the mixing head was a micro foam having thixotropy.

The thixotropy developing time (second), slump (mm), weight change before/after boiling (% by mass), workability, break strength (MPa), elongation at break (%) and waterproofness were evaluated of the obtained polyurethane sealant in accordance with the method described above.

The development of thixotropy was observed within 1 second after the moment of ejecting the sealant. The sag resistant test conducted with slump test equipment showed such a good result that sagging was 0 mm. The spreading operation with a spatula could be carried out satisfactorily after the development of thixotropy. And the waterproof test showed that the head was 235 mm; accordingly the waterproofness was evaluated as "○". These evaluation results are shown in Table 4.

Comparative Example 8

The tests were conducted in the same manner as in the example 9, except that 100.0 parts by weight of (A-1) prepolymer, as a principal component (A), and 200.0 parts by weight of sealing curing material (SB-3) prepared in the Preparation Example 21, as a curing agent (B), were used.

The thixotropy developing time (second), slump (mm), weight change before/after boiling (% by mass), workability, break strength (MPa), elongation at break (%) and waterproofness were evaluated of the obtained polyurethane sealant in accordance with the method described above.

The development of thixotropy took 50 seconds after the moment of ejection. The sag resistant test conducted with slump test equipment showed that the sagging was 3 mm. The spreading operation with a spatula could be carried out without causing any problems after the development of thixotropy. And the waterproof test showed that the head was 230 mm; accordingly the waterproofness was evaluated as "○". These evaluation results are shown in Table 4.

TABLE 4

|  | Example 9 | Example 10 | Comparative Example 8 |
|---|---|---|---|
| Principal component (Isocyanate Prepolymer) (parts by mass) | A-1  100.0 | A-2  100.0 | A-1  100.0 |
| Curing Agent (parts by mass) | SB-1  200.0 | SB-2  120.0 | SB-3  200.0 |
| Diamine Content (% by equivalent weight) | 15 | 15 | 15 |
| Thixotropy developing time (second) | within 1 second | within 1 second | 50 seconds |
| Slump (mm) | 0 mm | 0 mm | 3 mm |
| Weight Change before/after Boiling (% by mass) | 0.38 | 0.25 | 0.27 |
| Workability | ○ | ○ | ○ |
| Flash Point | ○ | ○ | ○ |
| Waterproof Test | ○ | ○ | ○ |
|  | (245 mm) | (235 mm) | (230 mm) |
| Break Strength (MPa) | 5.8 | 13.4 | 3.6 |
| Elongation at Break (%) | 280 | 110 | 370 |
| Total Density (kg/m³) |  | 583 |  |
| Average Diameter of Micro Foamed Cell (μm) |  | 40 |  |

What is claimed is:

1. A two-component polyurethane composition obtained from a principal component comprising a compound having an isocyanate group and a curing agent comprising a compound having active hydrogen, both of the principal component and the curing agent comprising substantially no thixotropic agent, the total time from the moment of mixing the principal component and the curing agent to the moment of developing thixotropy being 2 seconds or shorter, the slump of the mixture of the principal component and the curing agent being 3 mm or smaller, the compound having the active hydrogen consisting of a compound having a flash point of 60° C. or higher, the change in mass of a cured two-component polyurethane composition before/after being boiled in boiling water under atmospheric pressure for 60 minutes being 0.6% by mass or smaller.

2. The two-component polyurethane composition according to claim 1, characterized in that the break strength at −30° C. is not less than 0.5 MPa and not more than 30 MPa and the elongation at break at −30° C. is not less than 50% and not more than 700%.

3. The two-component polyurethane composition according to claim 1, characterized in that the compound having the active hydrogen has at least 2 hydroxyl groups and/or 2 amino groups.

4. The two-component polyurethane composition according to any one of claims 1 to 3, characterized in that the compound having the active hydrogen contains alicyclic diamine.

5. The two-component polyurethane composition according to claim 4, characterized in that the alicyclic diamine is a polycyclic aliphatic diamine having the following general formula (II):

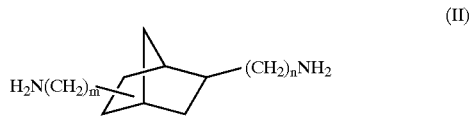

(II)

wherein m and n each independently represents an integer from 1 through 5.

6. The two-component polyurethane composition according to claim 4, characterized in that the compound having the active hydrogen contains an amount of alicyclic diamine that provides not less than 1% and not more than 50% by equivalent weight of the total active hydrogen groups in the same compound.

7. A process, of producing a two-component polyurethane composition according to claim 1, said process comprising:
mixing a principal component comprising a compound having an isocyanate group and a curing agent comprising alicyclic diamine, both of the principal component and the curing agent comprising substantially no thixotropic agent,
wherein the alicyclic diamine is a polycyclic aliphatic diamine having the following general formula (II):

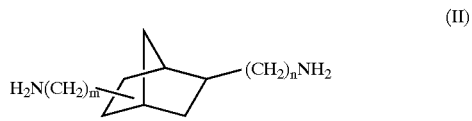

(II)

wherein m and n each independently represents an integer from 1 through 5.

8. A two-component micro foamed polyurethane elastomer obtained from a principal component comprising a compound having an isocyanate group, a curing agent comprising a compound having active hydrogen, and a foaming agent, both of the principal component and the curing agent comprising substantially no thixotropic agent, the total time from the moment of mixing the principal component, the curing agent, and the foaming agent to the moment of developing thixotropy being 2 seconds or shorter, the slump of the mixture of the principal component, the curing agent, and the foaming agent being 3 mm or smaller, the compound having the active hydrogen consisting of a compound having a flash point of 60° C. or higher, the change in mass of a cured two-component polyurethane composition before/after being boiled in boiling water under atmospheric pressure for 60 minutes being 0.6% by mass or smaller.

9. The two-component micro foamed polyurethane elastomer according to claim 8, characterized in that the total density is 100 to 900 kg/m$^3$ and the average diameter of the cells is 1 to 100 μm.

10. The two-component micro foamed polyurethane elastomer according to claim 8 or 9, characterized in that the compound having the active hydrogen contains alicyclic diamine.

11. The two-component micro foamed polyurethane composition according to claim 10, characterized in that the alicyclic diamine is a polycyclic aliphatic diamine having the following general formula (II):

(II)

wherein m and n each independently represents an integer from 1 through 5.

12. A polyurethane sealant comprising a two-component polyurethane composition according to claim 1 or a two-component micro foamed polyurethane elastomer according to claim 8.

13. A process of producing a polyurethane sealant according to claim 12, said process comprising:

mixing a principal component comprising a compound having an isocyanate group, a curing agent comprising alicyclic diamine, and optionally additives, all of the principal component, the curing agent, and the additives comprising substantially no thixotropic agent, wherein the alicyclic diamine is a polycyclic aliphatic diamine having the following general formula (II):

(II)

wherein m and n each independently represents an integer from 1 through 5.

14. A process of producing a polyurethane sealant according to claim 12, said process comprising:

mixing a principal component comprising a compound having an isocyanate group, a curing agent comprising alicyclic diamine, a foaming agent, and optionally additives, all of the principal component, the curing agent, the foaming agent, and the additives comprising substantially no thixotropic agent, wherein the alicyclic diamine is a polycyclic aliphatic diamine having the following general formula (II):

(II)

wherein m and n each independently represents an integer from 1 through 5.

* * * * *